United States Patent [19]
Wahnish

[11] 3,844,130
[45] Oct. 29, 1974

[54] AUTOMOBILE AIR CONDITIONING SYSTEM EMPLOYING AUXILIARY PRIME MOTOR

[76] Inventor: M. Ervin Wahnish, 624 E. Colonial Dr., Orlando, Fla. 32803

[22] Filed: July 9, 1973

[21] Appl. No.: 377,560

[52] U.S. Cl............ 62/133, 62/323, 62/239, 62/157, 62/243, 62/244, 62/236
[51] Int. Cl............................... B60h 3/04
[58] Field of Search............ 62/323, 239, 157, 244, 62/243, 236, 133, 134

[56] References Cited
UNITED STATES PATENTS

| | | | |
|---|---|---|---|
| 2,039,240 | 4/1936 | Frese | 62/267 |
| 2,053,206 | 9/1936 | Sargent | 62/244 |
| 2,106,515 | 1/1938 | Wanamaker | 62/323 |
| 2,251,376 | 8/1941 | Ross | 62/236 |
| 2,569,009 | 9/1951 | Kuempel | 62/323 |
| 2,699,043 | 1/1955 | Kramer | 62/323 |
| 2,922,290 | 1/1960 | Carraway | 62/323 |
| 3,218,821 | 11/1965 | Spatt | 62/244 |
| 3,545,222 | 12/1970 | Petranek | 62/133 |
| 3,646,773 | 3/1972 | Falk | 62/323 |

*Primary Examiner*—William J. Wye
*Attorney, Agent, or Firm*—Duckworth, Hobby & Allen

[57] ABSTRACT

An auxiliary air conditioner drive system for use with an automobile having an air conditioning system normally driven by the drive means of the automobile includes means completely carried by the automobile and independent of the automobile drive means for driving the air conditioning system, and means for disengaging the air conditioning system from the automobile drive means and thereafter engaging the independent drive means thereto.

17 Claims, 6 Drawing Figures

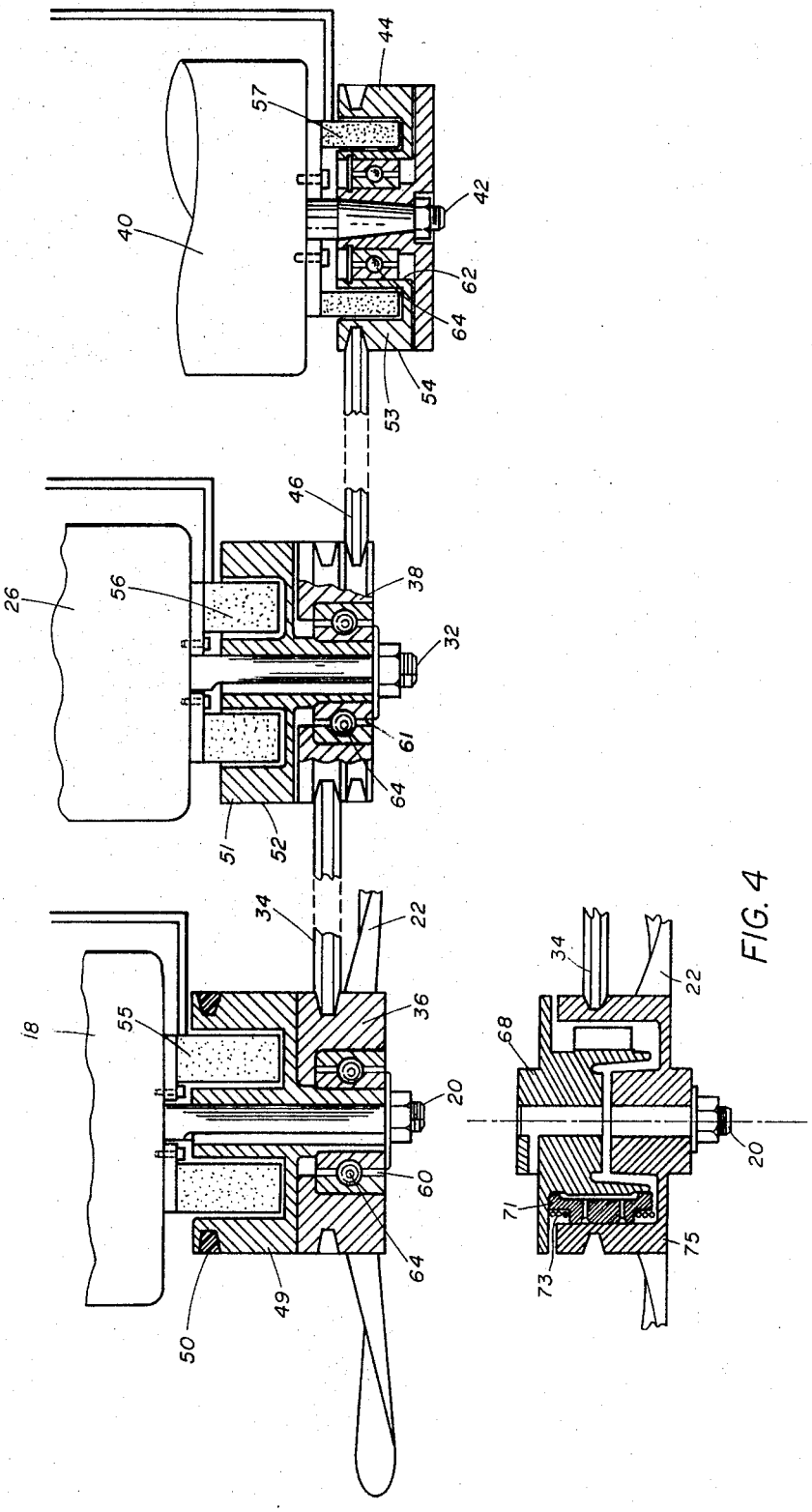

AUTOMOBILE AIR CONDITIONING SYSTEM EMPLOYING AUXILIARY PRIME MOTOR

BACKGROUND OF THE INVENTION

1. Field of the Invention

The present invention relates to vehicle air conditioning systems, and in particular to such systems which include auxiliary power means for driving the vehicle air conditioning system when the primary power means is not operating.

2. Description of the Prior Art

Automobile air conditioners have greatly increased in popularity in recent years, especially in the warmer climates and in areas experiencing long periods of high relative humidity.

Generally, presently known automobile air conditioners employ a standard refrigeration cycle, in which a refrigerant, such as freon, is passed between gaseous and liquid states. This cycle is affected by utilizing a compressor driven by a pulley and belt arrangement from the fan shaft of the automobile engine. The fan, which normally draws air across the radiator, is likewise employed in many automobile air conditioning systems to draw cooling air across the refrigerant cooling coils, which may be positioned in front of the radiator.

A perplexing aspect associated with the use of automotive air conditioners is that the vehicle's occupants must frequently suffer through a brief, but seemingly interminable period between entering the automobile and the time at which the air conditioner achieves a comfort level. This results, in part, from the manner in which automotive air conditioners are employed. In order to achieve efficient cooling, the vehicle's windows and vents must be closed. When the vehicle reaches its destination, it is often inconvenient to the driver or occupant to open the windows. As a result, when the driver returns to the automobile, the interior is usually much hotter than the ambient temperature.

There have been suggestions in the prior art for equipping a vehicle such that cooling takes place within the vehicle during periods when it is unattended. Parker, in U.S. Pat. No. 3,585,812, suggests an arrangement having refrigerant lines positioned in the top of the automobile. Hawthorne, in U.S. Pat. No. 3,455,403, discloses a remote control device capable of remotely starting the automobile engine and energizing the air conditioning system. Spatt, in U.S. Pat. No. 3,218,821, teaches an air conditioning system for buses, in which an independent air conditioning system separate from the main air conditioning system is employed in order to insure that adequate cooling can be supplied. Vander Hagen teaches a technique for employing a common coolant for both the automobile engine and the air conditioning system. (See U.S. Pat. No. 3,181,308).

In U.S. Pat. No. 3,512,373, White discloses an auxiliary power system for the cooling systems employed with refrigerator trucks, which is useful for maintaining cooling during periods when the truck is being unloaded. Specifically, White discloses an auxiliary electric motor coupled to the refrigerant compressor and adapted to be powered by alternating current supplied from the loading dock. White also discloses a clutching mechanism useful for disengaging the refrigerator's prime mover during periods when the compressor is being driven by the auxiliary motor.

SUMMARY OF THE INVENTION

The present invention contemplates an auxiliary air conditioner drive system adapted for use with an automobile of the type having an air conditioning system associated therewith and adapted to be driven by the drive means of the automobile, wherein the auxiliary system comprises means completely carried by the automobile and independent of the automobile drive means for driving the air conditioning system, and means for disengaging the air conditioning system from the automobile drive means and engaging the independent drive means thereto.

THE DRAWING

FIG. 3 is a top plan view, partially cut away, of an embodiment of the apparatus shown in FIG. 2.

FIG. 4 is a top plan view of an alternate arrangement for a portion of the apparatus shown in FIG. 3.

DETAILED DESCRIPTION

Figure 1:
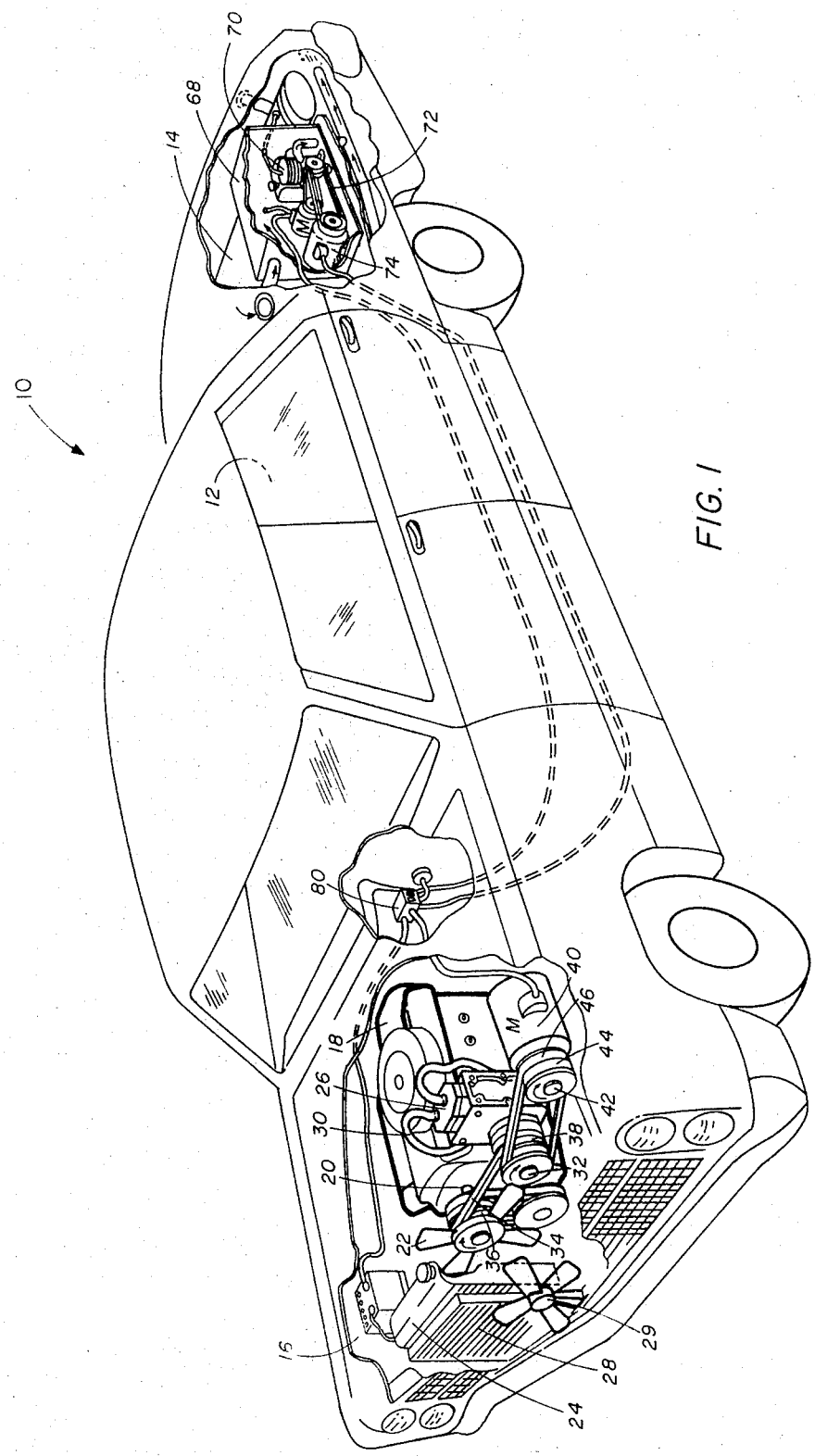
FIG. 1 is a perspective view, partially cut away, of an automobile employing an embodiment of a system in accordance with the present invention.

An embodiment of an auxiliary drive system for an automobile air conditioner is shown in the drawing and described with reference thereto.

Noting FIG. 1, an automobile, referred to generally as 10, includes an enclosed passenger compartment 12, a storage trunk 14 and an engine compartment 16. Located within the engine compartment 16 is an engine 18 having a fan shaft 20 with a radiator fan 22 mounted thereon, the fan shaft 20 being driven by the automobile drive shaft in a well known manner so as to effect air flow through a radiator 24 positioned in front of the fan 22.

Components of an air conditioning system are also located within the engine compartment 16. These components include a refrigerant compressor 26 and condenser coils 28, the condenser unit being positioned in front of the radiator 24. Suitably, a second fan 29 is positioned in front of the condenser unit 28 and is operated by the air conditioning system to more effectively cool the refrigerant in the condenser. Rotation of this second fan may be controlled by a centrifugal clutch, such as that described below with reference to FIG. 4. The air conditioner also includes an evaporator 27 within the passenger compartment 12; the evaporator is represented in the block diagram of FIG. 5. The refrigerant is carried between the condenser 28, evaporator 27 and compressor 26 by a fluid line 30. The compressor 26 further includes a shaft 32, and is operated by a belt 34 driven by a pulley 36 rotatably mounted on the fan shaft 20 and a second pulley 38 on the compressor shaft 32.

Figure 2:
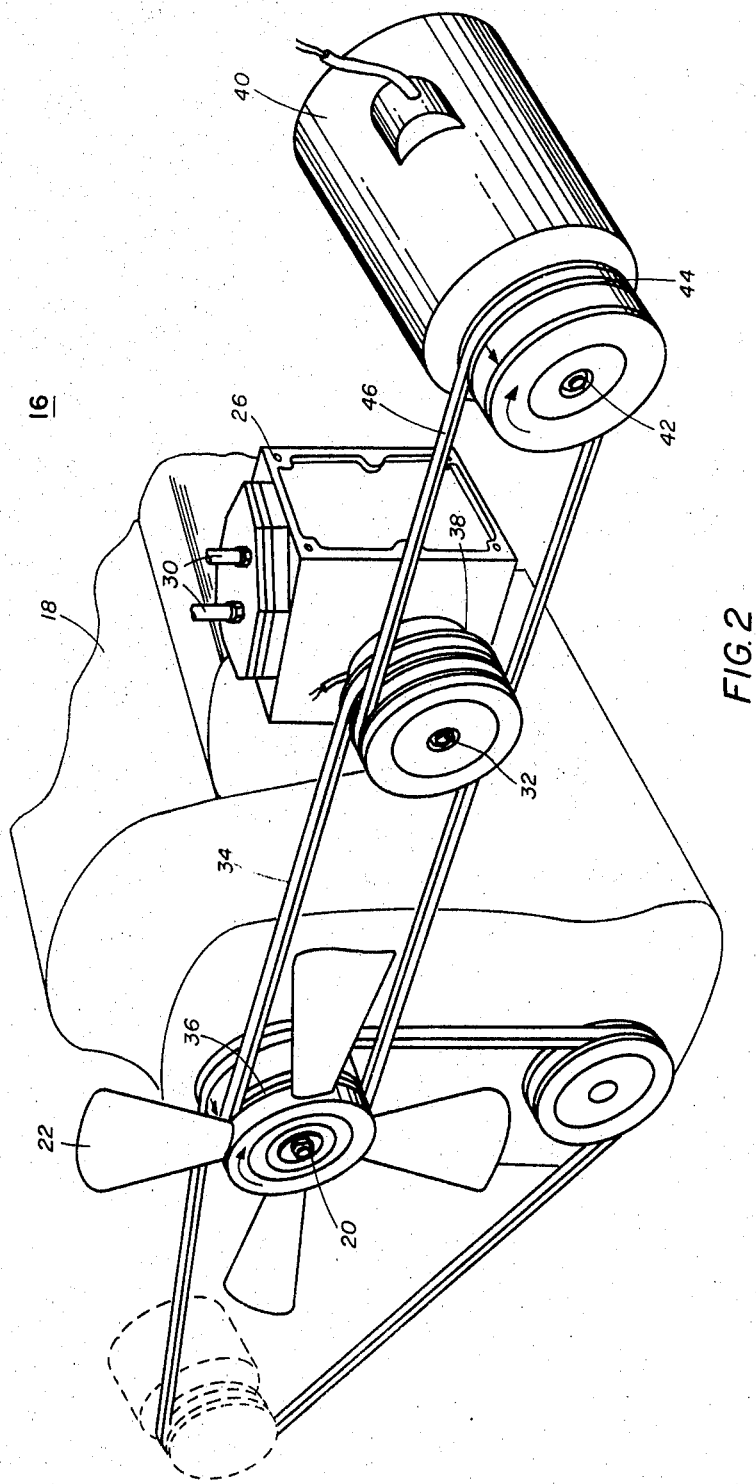
FIG. 2 is a perspective view of a portion of the automobile and system shown in FIG. 1.

Reference is now made to both FIGS. 1 and 2. In accordance with this invention, auxiliary means are provided for driving the air conditioner compressor 26 and the radiator fan 22 during periods when the automobile engine 18 is not operating. Further in accordance with this invention, the auxiliary drive means is completely carried by the automobile 10 and is independent of the automobile engine 18. The auxiliary drive system includes means for disengaging the radiator fan 22 from the fan shaft 20, and for engaging the auxiliary drive means. Noting FIG. 2, the auxiliary drive means comprises an electric motor 40 positioned within the engine compartment 16 and having a drive shaft 42 extending therefrom. A pulley 44 is rotatably mounted on the shaft 42 of the electric motor 40, and a drive belt 46 is fitted about the electric motor pulley 44 and the pulley 38 upon the air conditioner compressor shaft 32.

The fan shaft 20, the compressor shaft 32 and the motor shaft 42 are provided with means for alternately engaging and disengaging the fan 22 and the pulley 36 and the fan shaft 20, and the compressor and auxiliary motor pulleys 38 and 44 from each respective shaft 32 and 42. Noting the embodiment of FIG. 3, this alternately engaging-disengaging means comprises electric clutches 50, 52 and 54 fixed, respectively, on each of the fan shaft 20, the compressor shaft 32 and the electric motor shaft 42. Each electric clutch 50, 52 and 54 includes an electromagnet 55, 56 and 57, respectively, associated therewith, the electromagnets being dimensioned such as to have a shaped surface adjacent to a correspondingly shaped surface of a clutch plate 49, 51 and 53 adjacent to each respective pulley 36, 38 and 44. Each of the clutch plates, 49, 51 and 53 and pulleys 36, 38 and 44 are fabricated from a ferromagnetic material, such that the application of an appropriate electrical signal to the electromagnets 55–57 draws the respective pulley 36, 38 and 44 against the associated clutch plate 48, 51 and 53 and against the adjacent electromagnet, thereby causing that pulley to rotate with the respective shaft 20, 32 or 42.

Further, the pulleys 36, 38 and 44 are provided with corresponding low-friction bearing surfaces 60, 61 and 62 between each pulley and the associated shaft 20, 32 or 42. A low friction characteristic between each shaft 20, 32 and 42 and each low friction surface 60–62 effected with a ball bearing 64 between those respective surfaces.

A second embodiment of the engaging-disengaging means for the fan shaft 20 is shown in FIG. 4. In this embodiment, electric clutches 64 and 66 may be associated with the compressor and auxiliary motor shafts 32 and 42, respectively, in a manner similar to the embodiment shown in FIG. 3. The clutch associated with the fan shaft 20 comprises a centrifugal clutch 68, such that the pulley associated with the fan shaft 20 clutches with that shaft at predetermined rotational speed conditions. Various centrifugal clutch designs are known in the art, and the specific centrifugal clutching arrangement does not constitute a part of this invention. In particular, the clutch 68 includes a clutch plate 71 retained by a spring 73 during non-rotation. A pulley 75 surrounds the clutch plate 71, and is engaged by the clutch plate when sufficient shaft rotation occurs to overcome the retention of the spring 73.

Figure 5:
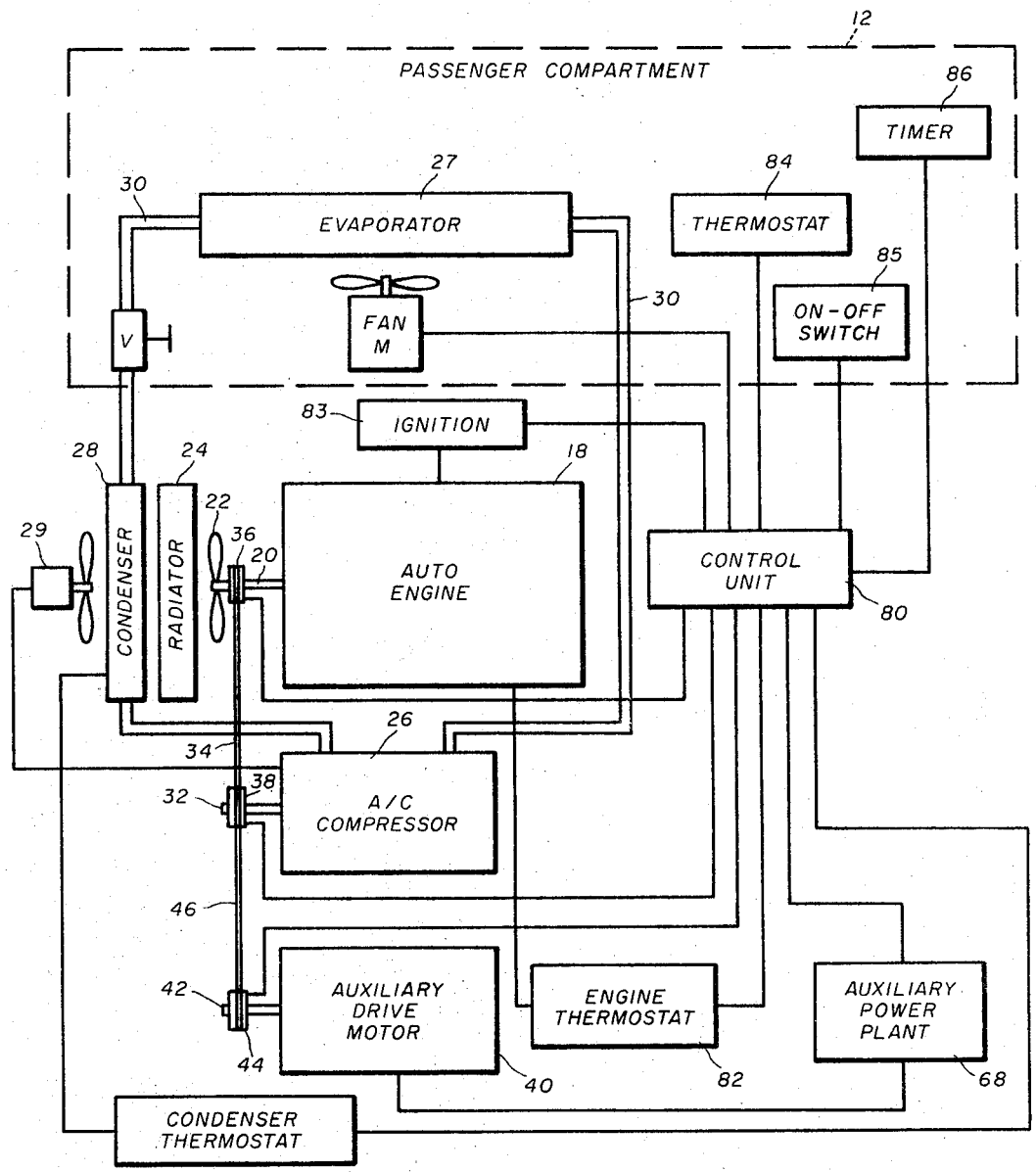
FIG. 5 is a block schematic diagram of circuit means and the coolant system employed with the apparatus shown in FIG. 1.
Figure 6:
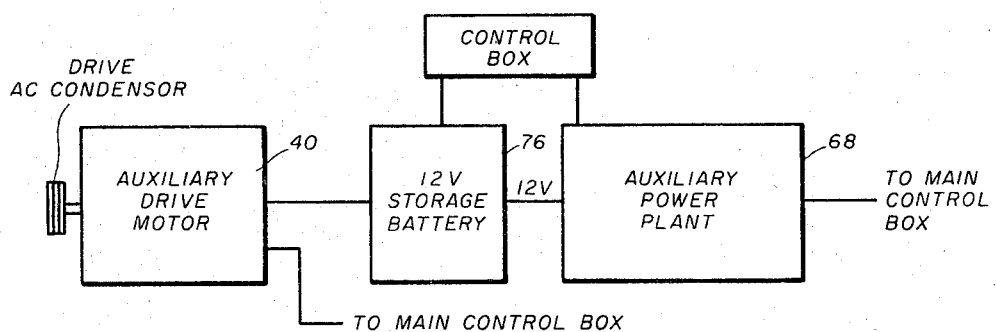
FIG. 6 is a block schematic diagram of an alternate embodiment of circuit means in accordance with the present invention.

Reference is again made to FIG. 1. In accordance with another aspect of this invention, energy conversion means completely carried by the automobile 10 and independent of the automobile engine 18 are provided for converting one form of energy into an electrical current capable of operating the auxiliary electric motor 40. As shown in FIGS. 1 and 5, the energy conversion means comprises an auxiliary power plant 68 positioned within the storage trunks 14 of the automobile 10. In one embodiment, the auxiliary power plant 68 comprises a self-starting motor-generator system 70. The self-starting motor-generator 70 may comprise any of a variety of commercially available alternating current or direct current generators, the auxiliary electrical motor 40 being adapted to operate with the current supplied by the generator 70. In an alternate arrangement shown in FIG. 6, the auxiliary power plant 68 is employed to charge a 12 volt direct current battery 76, which, in turn, operates the auxiliary drive motor 40. A variety of other power sources, such as solar panels, for example, may also be employed to power the auxiliary electric motor 40.

Turning now to FIG. 5, there is shown a block diagram of the air conditioner refrigerant system, including the compressor 26, the condenser 28 and the evaporator 27. Included with the auxiliary system of the present invention is a control unit 80, which includes therein circuit means for routing and processing the various electrical signals from the auxiliary power plant 68, the engine thermostat 82, the compressor 26, the ignition 83, and so forth. Positioned within the passenger compartment 12 is a thermostat 84, an on-off switch 85 and a timer 86, each being coupled to the control unit 80. A variety of known circuit configurations may be employed for the control unit 80, thermostat 84 and the timer 86.

The operation of the system of the present invention will now be described. Prior to leaving the automobile 10, the operator alternately switches on the auxiliary power system, sets the thermostat 84 to a preselected temperature, or sets the timer 86 for a period of time after which he or she wishes the air conditioning system to be energized to cool the passenger compartment 12. The auxiliary power system is energized when an appropriate indication is detected at one of the on-off switch 85, thermostat 84 or the timer 86. Simultaneously the electric clutches 52 and 53 associated with the compressor and the electric motor 26 and 40, respectively, are energized to engage the pulleys 38 and 44 with the corresponding shafts 32 and 42, as described above with reference to FIG. 3. Additionally the electric clutch 50 associated with the fan shaft 20 is disengaged, allowing the fan pulley 36 to rotate freely about the fan shaft with movement of the belt 34, thereby effecting air flow through the condenser 28 and the radiator 24. At the same time, the motor 40 drives the compressor 26 via the belt 46, effecting cooling of the passenger compartment 12.

I claim:

1. An auxiliary air conditioner drive system adapted for use with an automobile of the type having an air conditioning system associated therewith which is adapted to be driven by the drive means of said automobile, said auxiliary system comprising:
   means completely carried by said automobile and independent of said automobile drive means for driving said air conditioner system; and
   means carried by said automobile and independent of said engine for energizing said independent drive means;

means for disengaging said air conditioning system from said automobile drive means and engaging said independent drive means thereto; and means electrically coupled to said air conditioner system and said independent drive means for electrically controlling said engaging and disengaging means.

2. A system as recited in claim 1 wherein said air conditioning system includes coolant compressing means and wherein said independent drive means comprises an electric motor positioned near said compressor.

3. A system as recited in claim 2 wherein said fossil fuel burning means comprises:
a gasoline-driven engine; and
electrical generating means coupled with said gasoline driven engine.

4. A system as recited in claim 1 wherein said automobile drive means comprises a shaft having a fan on one end thereof, and wherein said disengaging means includes means for disengaging said fan from rotation with said shaft.

5. A system as recited in claim 4 wherein said air conditioning system includes coolant compressing means having a shaft generally parallel with and spaced from said shaft of said automobile drive means, and wherein said engaging and disengaging means comprises clutching means on each of said air conditioning and automobile shafts.

6. A system as recited in claim 5 wherein said independent drive means includes a shaft substantially parallel with said compressor shaft and said automobile shaft, and wherein said engaging and disengaging means further comprises clutching means on said shaft of said independent drive means.

7. A system as recited in claim 6 further comprising:

a first pulley on, and clutchable with, said automobile shaft by said clutch means associated therewith;
a second pulley on, and clutchable with, said compressor shaft by said clutch means associated therewith;
a third pulley on, and clutchable with, said shaft of said independent drive means by said clutch means associated therewith;
a first endless drive belt tensioned about said first and second pulleys;
a second endless drive belt tensioned about said second and third pulleys; and
means for operating said clutching means so as to disengage said first pulley from rotation with said automobile fan shaft and for engaging said third pulley for rotation with said shaft of said independent drive means.

8. A system as recited in claim 7 wherein said clutch with said third pulley comprises:
an electromagnet fixed on said independent drive means shaft;
said third pulley comprising a ferromagnetic material and being rotatable mounted on said independent drive means shaft; and wherein
said clutch operating means includes means for energizing said electromagnet to attract said third pulley to thereafter hold in rotation with said independent drive means shaft.

9. A system as recited in claim 8 wherein said clutch associated with said first pulley comprises:
an electromagnet fixed on said automobile fan shaft;

said first pulley comprising a ferromagnetic material and being rotatably mounted on said automobile shaft; and wherein
said clutch operating means includes means for energizing said electromagnets to attract said pulleys thereto and thereafter hold in rotation with the respective shafts.

10. A system as recited in claim 8 wherein said clutch associated with said first pulley comprises a centrifugal clutch.

11. A system as recited in claim 1 wherein said electrical controlling means is further coupled with said automobile drive means.

12. A system as recited in claim 1 wherein said automobile includes an enclosed passenger compartment, and wherein said auxiliary system further comprises means adapted to be positioned in said passenger compartment for initiating said controlling means under predetermined conditions.

13. A system as recited in claim 12 wherein said initiating means comprises a thermostat positioned in said passenger compartment and coupled with said controlling means.

14. A system as recited in claim 12 wherein said initiating means comprises a timer positioned within said passenger compartment and coupled with said controlling means.

15. In combination:
an automobile driven by an engine, said engine including a fan shaft extending therefrom and rotated by said engine;
a fan rotatably mounted on said fan shaft;
means for engaging said fan with said shaft;
an air conditioning compressor unit positioned adjacent to said engine and including a compressor shaft extending substantially parallel with said fan shaft;
means for rotating said compressor shaft with said fan shaft only when said fan is engaged thereto; and means independent of said engine and said compressor for rotating said compressor shaft and said fan when said fan is disengaged from said fan shaft.

16. The combination of claim 15, further comprising means completely carried by said automobile for powering said independent rotating means.

17. The combination of claim 16 wherein said independent rotating means comprises:
an electric motor having a shaft;
a pulley rotatably mounted on said electric motor shaft;
clutch means mounted on said shaft and adapted to fix said pulley with said shaft; and
means for energizing said clutch means during predetermined periods when said automobile engine is not operating.

* * * * *